United States Patent [19]

Debuisson et al.

[11] Patent Number: 4,890,723
[45] Date of Patent: Jan. 2, 1990

[54] PLATE TYPE CHIP CONVEYOR

[75] Inventors: Michael Debuisson, Trazegnies; Joseph A. Jose, Thuin; Marcel Rigo, Roselies, all of Belgium

[73] Assignee: Caterpillar Inc., Peoria, Ill.

[21] Appl. No.: 199,089

[22] Filed: May 26, 1988

[30] Foreign Application Priority Data

Sep. 16, 1987 [BE] Belgium .............................. 8701044

[51] Int. Cl.⁴ ............................................ B65G 19/14
[52] U.S. Cl. .................................... 198/716; 198/728; 198/731; 198/734
[58] Field of Search ............... 198/716, 731, 733, 734, 198/719, 727, 728, 729

[56] References Cited

U.S. PATENT DOCUMENTS

| | | | |
|---|---|---|---|
| 853,652 | 5/1907 | Steele | 198/733 X |
| 1,935,437 | 11/1933 | Elmer | 198/734 X |
| 2,110,204 | 3/1938 | Davis | 198/716 |
| 2,383,932 | 7/1943 | Brunner | 198/733 X |
| 2,756,866 | 7/1956 | Wilde, Jr. | 198/716 X |
| 3,447,667 | 6/1969 | Patz et al. | 198/734 X |
| 3,502,199 | 3/1970 | Bramley | 198/734 X |
| 3,722,664 | 3/1973 | Hart et al. | 198/731 X |
| 4,380,284 | 4/1983 | Ito et al. | 198/494 |

FOREIGN PATENT DOCUMENTS

| | | | |
|---|---|---|---|
| 546916 | 10/1957 | Canada | 198/731 |
| 585865 | 10/1959 | Canada | 198/716 |
| 2211383 | 7/1974 | France . | |
| 2383095 | 11/1978 | France | 198/733 |
| 500633 | 11/1954 | Italy | 198/716 |
| 31805 | 2/1983 | Japan | 198/731 |
| 610535 | 10/1983 | Japan . | |
| 60-55406 | 12/1985 | Japan . | |
| 61-57249 | 12/1985 | Japan . | |
| 62-14443 | 4/1987 | Japan . | |
| 62-16414 | 4/1987 | Japan . | |
| 0093111 | 4/1987 | Japan | 198/731 |
| 62-51850 | 11/1987 | Japan . | |
| 549295 | 11/1942 | United Kingdom | 198/716 |
| 667792 | 3/1952 | United Kingdom . | |
| 0783759 | 9/1957 | United Kingdom | 198/731 |

Primary Examiner—Robert J. Spar
Assistant Examiner—James R. Bidwell
Attorney, Agent, or Firm—Robert A. McFall; Sterling R. Booth, Jr.

[57] ABSTRACT

A chip conveyor moves material through a conduit using plates of substantially oval shape, the axis of symmetry of which coincides substantially with the axis of the drive chain. The plates consist of two identical half-plates joined together and mounted on the drive chain. The conveyor is especially useful for transporting chips from machine tools.

12 Claims, 3 Drawing Sheets

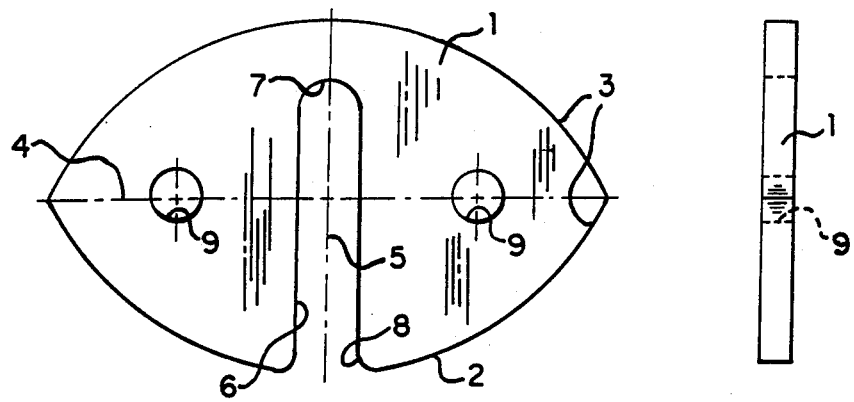
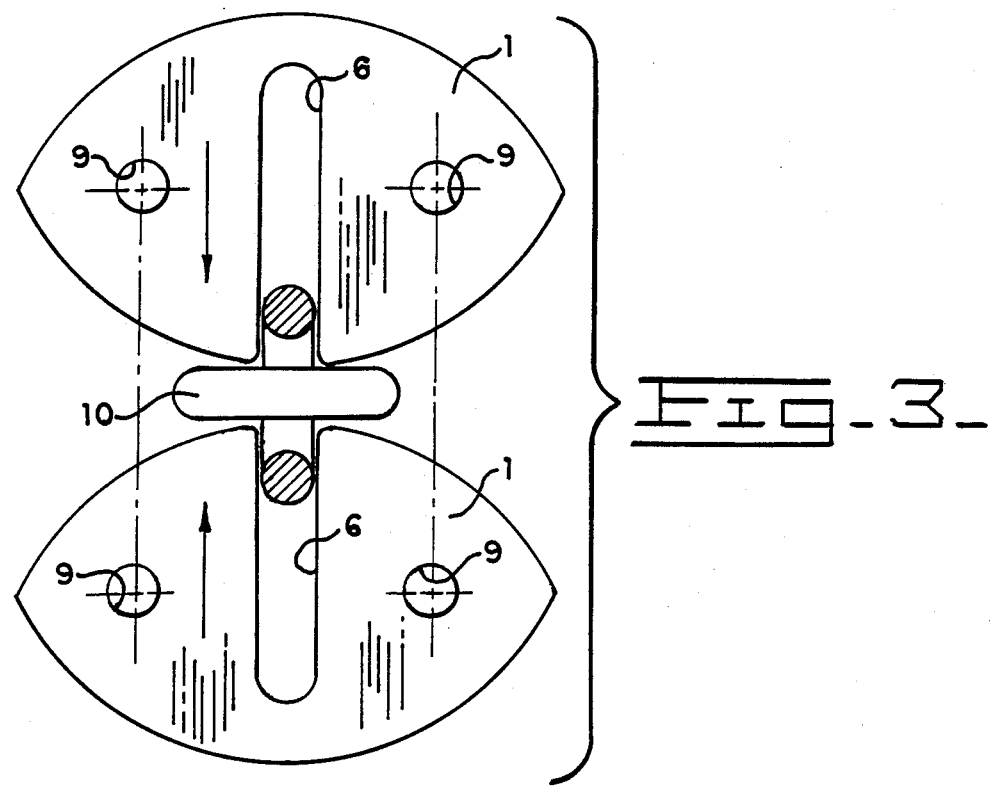

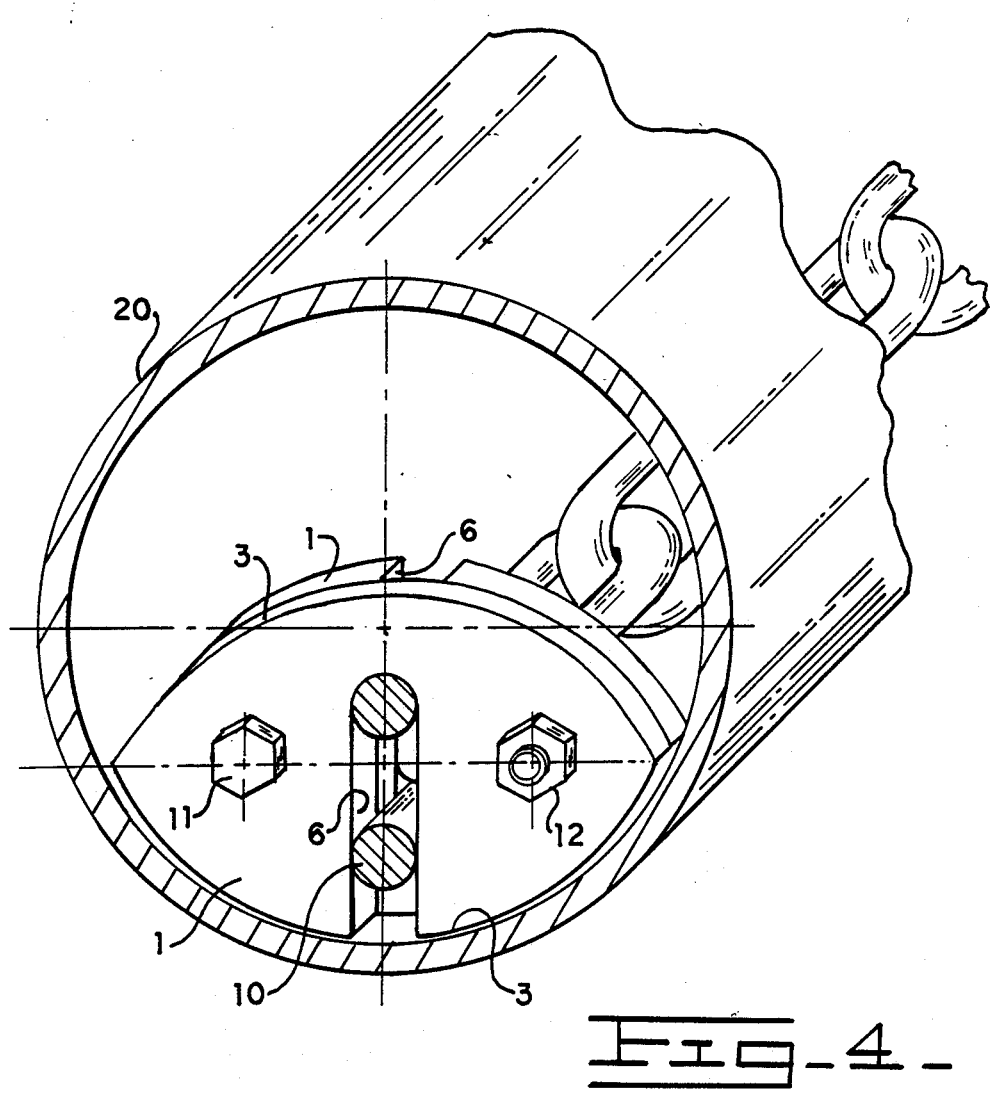
Fig_4

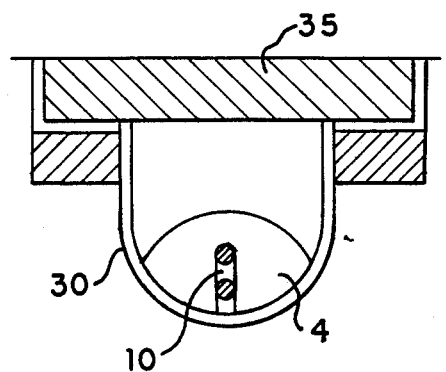
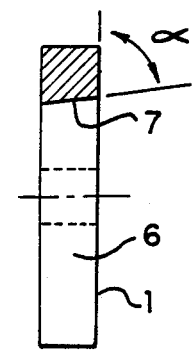
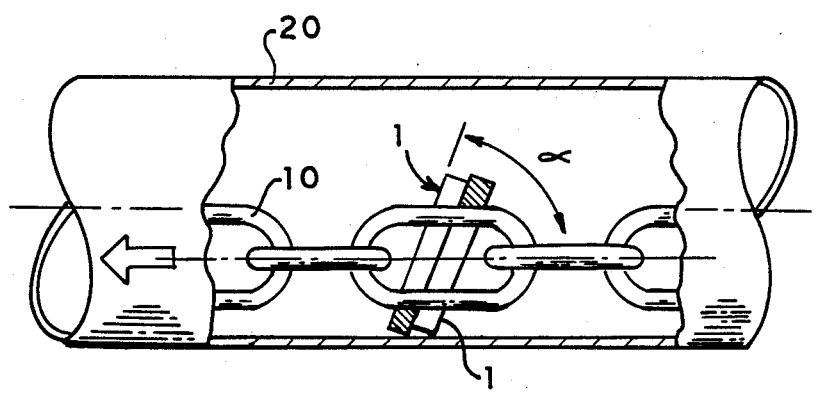

PLATE TYPE CHIP CONVEYOR

TECHNICAL FIELD

This invention relates generally to three-dimensional plate conveyors and more particularly to conveyors for chips.

BACKGROUND ART

Chips coming from a group of machine tools or machining complexes are typically conveyed through a common network of conduits to a processing station and, after the cutting oil has been recovered, they are discharged into containers. Such network of conduits is fed by the chip hoppers of several machine tools or machining complexes and may extend in three dimensions comprising both straight sections and 45°, 90° or 180° curved sections. The chips are transported inside the conduits by means of plates mounted at regular intervals on the links of an endless chain. The chain is driven by a pulley, advantageously designed for the chain and the plates, which is operatively connected to a variable-speed driven gear.

In prior embodiments, the moving plates are circularly shaped, have a diameter substantially the same as the inside diameter of the conduit, and are offset relative to the supporting drive chain which passes through a lower half of the plate. Such conveyors have a high dead weight attributable to the large diameter of the plates, are difficult to start when empty and even more difficult to start under load. Under loaded start-up, the chain is subjected to considerable tensile forces and to high torsional forces when plates pass through the curved sections. Furthermore, the relatively heavy circularly shaped plates have a large surface contact with the conduit. This results in substantial frictional forces which cause rapid wear of the components in contact.

These adverse factors give rise to frequent jamming of the conveyor system regularly causing failure or fracture of one or more of the system components. These two types of recurring breakdowns, jamming and damage to system components, mean that the performance of such installations is only moderate.

The present invention is directed to overcoming the problems set forth above. It is desirable to increase the performance of such conveyor systems by minimizing, and indeed even eliminating, their breakdown as a result of jamming or component failure. It is also desirable to reduce the tensile and torsional forces to which the chain is subjected by reducing the dead weight of the plates, the amount of surface contact between the plates and the conduit, and optimizing the location and manner of the plate attachment to the respective supporting link.

BRIEF DESCRIPTION OF THE DRAWINGS

FIG. 1 is a plan view of a half-plate according to the present invention.

FIG. 2 is a side view of the half plate shown in FIG. 1.

FIG. 3 shows diagrammatically the mounting of two half-plates on a supporting link of the chain.

FIG. 4 is a view illustrating the conveyor mounted in a tubular conduit.

FIG. 5 shows a section through a duct in a floor slab equipped with the conveyor.

FIG. 6 is a view in vertical section through a plate according to the invention.

FIG. 7 is a view in longitudinal section through a conveyor assembly according to the invention.

BEST MODE FOR CARRYING OUT THE INVENTION

The plate which is the subject of the invention is formed by two identical half-plates 1, one of which is shown in FIGS. 1 and 2. Each of the half-plates 1 have a virtually oval contour 2, formed by two circular arcs 3 of the same length and of a radius equal to or preferably slightly less than the inner radius of the conduit 20. Each of the half-plates are symmetrical relative to their major axis 4 and their minor axis 5. Preferably, the minor axis of the oval shape defining the plates is slightly longer than the inner radius of the conduit, i.e., the height of the plates is slightly more than one-half the diameter of the conduit. Furthermore, in the preferred embodiment the ratio between the major axis and the minor axis of the over shape is substantially equal to 1.5. Still further, the minor axis 5 is also the mid-axis of a notch or slot 6 closed at one end 7 and open at the other end 8. Two holes 9 of the same diameter are arranged on the major axis 4 at an equal distance on either side of the notch 6.

A drive plate representing an embodiment of the present invention is obtained by mounting two of the half-plates 1 head to foot, as shown in FIGS. 2 and 3 on a supporting link of a power driven link-type conveyor chain 10. The two half-plates are mounted onto the chain by slipping the two notches 6 onto the link until the two plates 1 overlap, and then joined together as shown in FIG. 4, by means of two bolts and nuts 11,12, inserted through the aligned holes 9.

As best shown in FIG. 4, a conveyor is formed by joining together two half-plates 1 on a link of a chain 10 and arranged in the bottom of a tubular conduit 20. When the chain passes through a curved section of the conduit and changes direction, all the plates driven by the chain 10 are free to move inside the conduit in such a way that either the top or the bottom circular arc 3 will contact the inner face of the conduit 20.

Alternatively, instead of a tubular conduit 20, the conveyor may include a partially circular duct 30 embedded in a floor slab 35, as illustrated in FIG. 5.

The closed end 7 of the notch 6 of the plate may advantageously be formed non-perpendicular with the face of the plate, as shown in FIG. 6. This embodiment makes it possible to mount the plates on the links easily, and because of the non-perpendicular surface at the closed end 7 of the notch, the plate takes a position on the chain link at a slight inclination, indicated by the angle α, as shown in FIG. 7. This inclination of the plate in relation to the longitudinal axis of the conduit allows greater conformity of the surfaces between plates and the conduit and easy movement especially through the curved sections, i.e., precisely at the points which are the most critical with respect to friction and therefore wear.

Industrial Applicability

Different forms of plates were produced and many tests were conducted by changing the location and the manner of fastening the plates on the supporting link. These tests made it possible to determine the preferred shape of the plate and the best mounting position of the plate on its supporting link. The sought after aims are achieved in installations equipped with such conveyors. It has been found that the chip delivery capacity of conveyors having drive plates representative of the present invention is up to four times higher than that attained in conventional installations with large-surface circular plates.

Other aspects, features and advantages of the present invention can be obtained from a study of this disclosure together with the appended claims.

We claim:

1. A conveyor composed of an assembly of straight and curved conduit sections in which moves drive means having a plurality of spaced drive plate assemblies mounted thereon, characterized in that the drive plate assemblies have a substantially oval shape comprising a major axis and a minor axis and an axis of symmetry substantially coinciding with the axis of the drive means, each of said drive plate assemblies comprising two identical plates each having a notch disposed along the minor axis and closed at a first end and open at a second end, and wherein the closed end of the notch is non-perpendicular with respect to the surface of the plate.

2. A conveyor as set forth in claim 1, wherein the minor axis of the oval shape is slightly longer than the inner radius of the conduit.

3. A conveyor as set forth in claim 1, wherein the ratio between the major axis and the minor axis of the oval shape is substantially equal to 1.5.

4. A conveyor as set forth in claim 1, wherein the two identical plates are mounted on the drive means with respective closed ends of the notch disposed on opposite sides of said drive means and maintained in said position against one another by fastening means.

5. A conveyor as set forth in claim 1, wherein each of said plates have a pair of openings of the same diameter arranged symmetrically along the major axis of the plate with one opening of said pair being disposed on a respective opposite side of said notch.

6. A conveyor as set forth in claim 4, wherein the means for fastening the two plates to one another and to the drive means includes a pair of bolts and nuts.

7. A conveyor as set forth in claim 1 wherein the drive means consists of a power-driven link chain.

8. A conveyor composed of an assembly of straight and curved conduit sections in which moves drive means having a plurality of spaced drive plates mounted thereon, characterized in that the drive plates have a substantially oval shape comprising a major axis and a minor axis and an axis of symmetry substantially coinciding with the axis of the drive means, each of the drive plates having a slot disposed along its minor axis, the slot having an end which is non-perpendicular with respect to the surface of the plate.

9. A conveyor as set forth in claim 8, wherein the conduit has a substantially circular cross-section and a major portion of said oval shape of each of said drive plates is defined by two identical circular arcs having a radius substantially equal to the inner radius of the conduit.

10. A conveyor as set forth in claim 8, wherein the conduit has a substantially circular cross section and a major portion of said oval shape of each of said drive plates is defined by two identical circular arcs having a radius slightly less than the inner radius of the conduit.

11. A conveying apparatus including a conduit, a plurality of chain links disposed in the conduit for movement longitudinally thereof, a plurality of drive plate assemblies disposed crosswise of the conduit, each drive plate assembly having a face with intersecting major and minor axes of symmetry, and means mounting each drive plate assembly on one of said chain links for limited longitudinal movement along said chain link and for limited inclination generally about said major axis of the drive plate assembly, said mounting means including a notch closed at both ends for mounting the drive plate assembly on its respective chain link, and said notch being sized to provide said limited inclination, and each drive plate assembly including fastening means and two drive plates, said drive plates having a minor axis of symmetry and, disposed along said minor axis of the drive plate, a notch closed at a first end and open at a second end, wherein the drive plates are positioned on the chain link adjacent each other with respective closed ends of the notch disposed on opposite sides of said chain link, and said fastening means maintaining said drive plates in said position.

12. A conveyor as set forth in claim 11, wherein each drive plate has a pair of openings for receiving the fastening means, the openings being of the same size and arranged symmetrically on opposite sides of said notch.

* * * * *